United States Patent [19]

Morse

[11] 4,098,630
[45] Jul. 4, 1978

[54] PROCESS FOR MAKING DECORATIVE RESIN PANELS
[75] Inventor: Donald B. Morse, Joliet, Ill.
[73] Assignee: Kemlite Corporation, Joliet, Ill.
[21] Appl. No.: 711,576
[22] Filed: Aug. 4, 1976
[51] Int. Cl.² ............................................. B32B 31/00
[52] U.S. Cl. ................................. 156/219; 156/62.2; 156/209; 156/247; 428/171; 428/172
[58] Field of Search ................. 156/62.2, 62.4, 209, 156/219, 246, 298, 220, 247; 427/206; 428/161, 171, 172, 297, 480; 264/212, 289, 210 R, 280

[56] References Cited

U.S. PATENT DOCUMENTS

| 3,258,513 | 6/1966 | Berry et al. | 156/209 |
|---|---|---|---|
| 3,436,301 | 4/1969 | McHale | 156/332 |
| 3,560,294 | 2/1971 | Potkanowicz | 156/295 |
| 3,657,032 | 4/1972 | Watanabe et al. | 156/62.4 |
| 3,657,036 | 4/1972 | Mullenhoff et al. | 156/209 |
| 3,842,152 | 10/1974 | Witfield et al. | 264/210 R |
| 3,888,716 | 6/1975 | Morse | 156/295 |
| 3,890,421 | 6/1975 | Habozit | 264/289 |
| 3,922,329 | 11/1975 | Kim et al. | 264/210 R X |

OTHER PUBLICATIONS

Kirk-Othmer, Encyclopedia of Chemical Technology, 2d ed., vol. 16, p. 161 (1968).
Thermoplastic Polyester; Kramer; Modern Plastics Encyclopedia; vol. 51, Oct. 1974, pp. 75-76.

Primary Examiner—William A. Powell

[57] ABSTRACT

A process for making a decorative glass fiber reinforced resin panel in which a polyoxyethyleneoxyterephthaloyl film is embossed and layers of liquid thermosetting resin and glass fibers put with it to make a laminated structure, passing the laminated structure between pressure rolls and heating the structure to cure the resin. The embossed film may then be removed to leave the embossed pattern on the surface of the panel.

9 Claims, 2 Drawing Figures

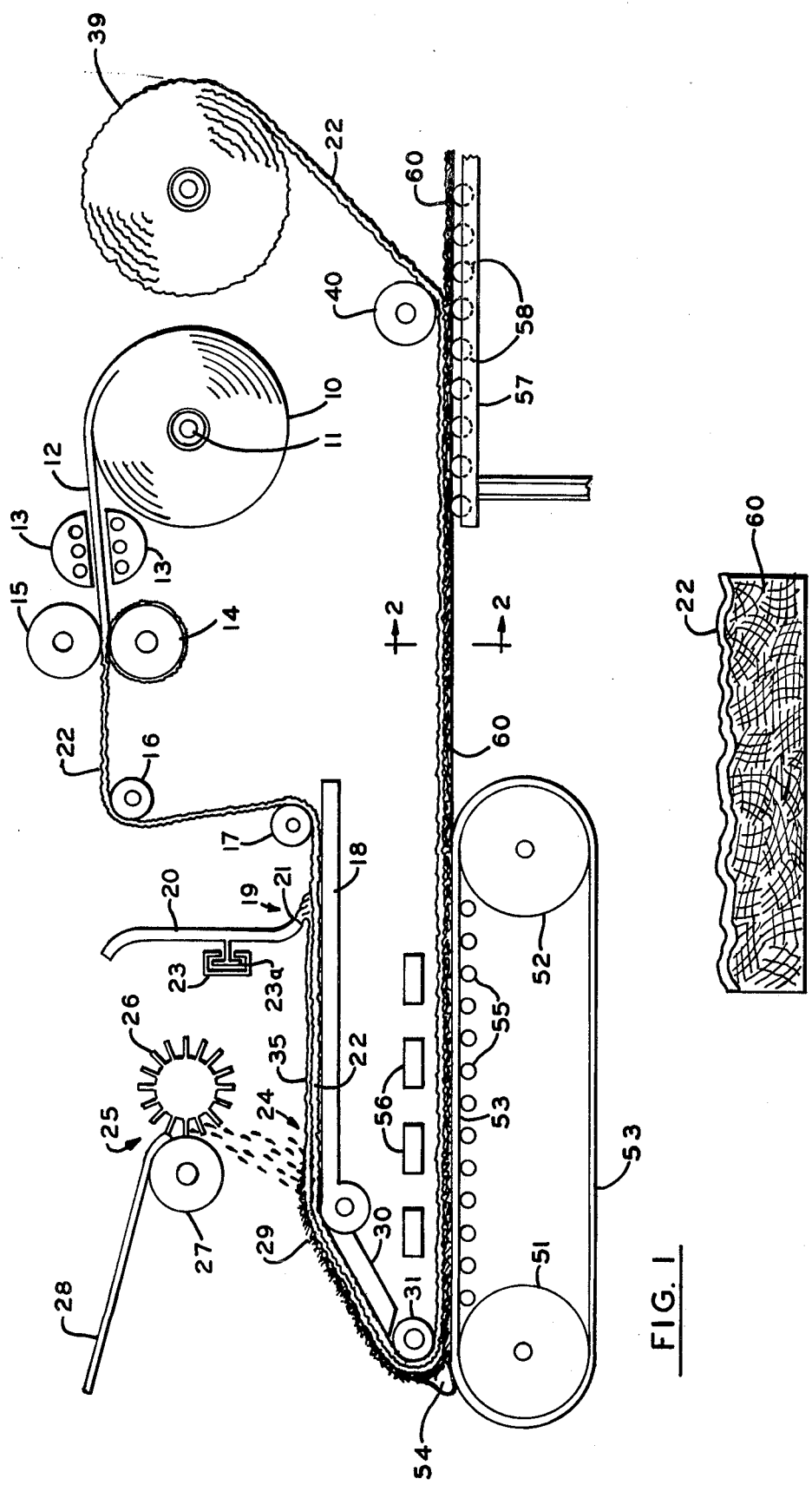

PROCESS FOR MAKING DECORATIVE RESIN PANELS

This invention relates to a process for preparing an embossed resin panel, and particularly to such a process for making a glass fiber reinforced panel having an embossed surface thereon.

BACKGROUND

Glass fiber reinforced resin panels are useful for construction, as liners for cars and trucks, for food plants, in dairies and in other industries where there is need for a strong panel which is unaffected by chemicals and resistant to abrasion.

It would be very desirable to produce such panels which not only have great strength and durability but are more pleasing in their appearance. It is possible to paint or paint a design on the surface of the panel, but such a design would add expense in the manufacture of the panel and would be likely to be marred or destroyed by abrasion in normal use of the panel.

The use of printing to provide a decorative panel is illustrated in U.S. Pat. Nos. 3,313,676 and 3,734,807 which involve a laminate having a rigid base member, a print sheet over the base member and a transparent polyvinylfluoride film which is electrically treated or coated with an adhesive to cause it to adhere to the print sheet.

In patent application Ser. No. 673,869, filed Apr. 5, 1976, I describe a method and machine for making glass fiber reinforced resin panels. In accordance with the processes therein disclosed a cellulose film is laid down. On this is placed a layer of thermosetting resin, and over this is placed a layer of glass fibers. The structure, including the film, the resin and the glass fibers, are passed between rolls so as to press the glass fibers into the resin, remove air voids and compact the structure to a desired thickness. After this the structure is heated to cure the resin and the cellulose film is removed.

I modified the process above described by embossing the cellulose film used in that process and by using the embossed film as the carrier film to make the resin panel. Although such modified process was operable it presented difficulties which caused trouble is manufacture and resulted in a substantial amount of damaged product. It appeared that when the resin was pressed against the embossed film some of the resin would occasionally come through the film. Examination of the embossed film prior to its use did not reveal any holes or spongy areas through which resin could pass, but the occasions when, for some reason, the resin did pass through the film, resulted in degrading of the product and gumming of the machine. No amount of care in the embossing of the film seemed to affect the leakage of resin through the film through openings which, for want of a better term, are called "pin holes".

SUMMARY

I have discovered that the foregoing difficulties may be overcome by utilizing a film of polyoxyethyleneoxyterephthaloyl, subjecting this film to an embossing procedure, using the embossed film to form a laminated resin structure, subjecting the lamination to pressure, and heating to cure the resin.

DESCRIPTION

The compound of polyoxyethyleneoxyterephthaloyl above-referred to is a linear saturated thermoplastic polymer. It has a melting point of about 250°–265° C. and a glass transition temperature of about 125° C. It is believed to contain repeating structural units of the following formula:

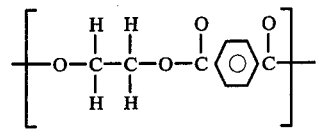

It may be prepared by condensing equal molar amounts of terephthalic acid and ethylene glycol. The polymeric chains may have a molecular weight in the range of 20,000 to 40,000. This compound may be extruded to form a film and the film so formed may be biaxially stretched to prepare it for the manufacture of panels according to the present process.

An embodiment of my present process is illustrated by the accompanying drawing in which:

FIG. 1 is a diagramatic representation of a machine for carrying out the improved process, and FIG. 2 is a view in cross section of the film and glass reinforced resin laminate as seen from line 2 — 2 of FIG. 1 during the course of manufacture.

Referring to the drawings, roll 10 of film is mounted on shaft 11. The compound of this film, polyoxyethyleneoxyterephthaloyl, was made by condensing equal molar parts of terephthalic acid and ethylene glycol. It is a thermoplastic polymer which has been extruded in film form and the film biaxially stretched.

Film 12 from roll 10 is passed between a pair of heaters 13 which serve to heat the film to a temperature of the order of from 300° to 400° F. to make the film pliable. Then the film, in a pliable condition, is passed between rolls 14 and 15 which give the film an embossed pattern. The action of rolls 14, 15 is to stretch and expand portions of the film either above or below the normal plane of the film, thus to form a pattern of some kind. Rolls 14 and 15 are matching rolls, and the raised portions on one or another of these rolls match with depressions on the other roll, and as the film passes between these rolls it receives the pattern from the surfaces of the roll. In the drawings, especially FIG. 2, the top and bottom surfaces are indicated by an irregular or wave-like line. It must also be understood that in the drawings the thickness of the layers and other dimensions may be exaggerated for purposes of illustration.

From rolls 14, 15 the embossed film 22 is led over roll 16, under roll 17, and onto a horizontal table or platform support 18. As it is passed forwardly on support 18 it comes to the station 19 and at this station a thermosetting resin is delivered to the top of the film and it forms a layer of resin on the film. This resin may be any unsaturated liquid thermosetting resin. Preferably, it is an unsaturated polyester resin cross linked with a monomer such as styrene, and may have a predetermined proportion of catalysts, fillers, and pigments.

This resin may be passed through tube 20 to a nozzle 21 which is arranged to move across the film and back again to deliver the resin in a layer on top of film 22. Suitably the tube 20 or nozzle 21 may be carried in a channel 23a of a cross member 23 and mechanically moved back and forth across the film as the resin is being delivered. By the term "liquid" I mean that the resin is flowable and when placed on a horizontal surface will spread out over the surface to form a layer of substantially uniform thickness. The resin flows into a substantially uniform layer 35, closing the gaps at any small areas not initially struck by liquid resin issuing directly from the nozzle. This resin layer 35 lies on top of the film layer 22 and passes forwardly in the machine on this film.

When the embossed film 22, with resin layer 35 thereon, reached the station 24 it passes under the glass cutter 25 and receives sprinklings of glass fibers on top of the resin layer. The cutter 25 includes a pair of rolls 26 and 27, roll 26 being equipped with knives. Strands of glass filaments are fed between the rolls 26 and 27 and upon rotation of these rolls toward each other the blades of roll 26 bear against roll 27 to chop the glass strands and allow the fibers to fall in a random distributed fashion down onto the resin layer. Thus there is formed a layer of glass fibers 29 the lowermost of which are embedded in the resin layer. The glass fibers form a kind of mat which is held by and travels along with the resin layer. The composite which passes forwardly beyond the glass chopper includes the embossed film of polyoxyethyleneoxyterephthaloyl on the bottom, the resin layer 35 in the center and the glass fiber layer 29 on top. Instead of supplying the glass fibers as a sprinkling of such fibers on top of the resin layer, a preformed glass mat may be put down on top of the resin layer and this preformed mat passed along with the film 22 and resin layer 35 forwardly within the machine.

A pivoted platform leaf 30 is provided at the front end of the platform 18. This leaf is pivoted at its juncture with the platform 18 and extends at an incline toward its front edge. The front of leaf 30 is in some appropriate way arranged to move upwardly and downwardly with the roll 31 when this roll is raised or lowered to change the spacing between rolls 31 and 51.

Rolls 31 and 51 may be considered a pair of rolls which play an important part in the forming of the panel. The roll 31, which may be called a pressure roll, is mounted above roll 51 and is spaced from roll 51 by a distance which regulates the thickness of the panel being made. The roll 51 and the roll 52 have extended about them a belt 53 made of stainless steel or other material which is impervious to the resin. The entire laminate including the embossed film 22, the resin 35 and the glass fiber layer is passed about pressure roll 31 and between rolls 31 and 51 on the belt 53. A resin pool 54 extends substantially across the width of the resin layer. It is fed and maintained by resin from layer 35 and serves the function of distributing and feeding the resin to local spots where it may be needed to produce complete impregnation of the glass fibers. The pool does not dissipate and drain forwardly down the front of belt 53, probably due to the contact with the belt which is moving in an opposite direction.

As the film, resin and glass fiber structure moves between rolls 31 and 51 to the nip of these rolls and onto belt 53 the resin and the glass fiber layers are pressed together, and against the embossed film 22. It is significant that the resin being pressed against the embossed surface of film 22 is in liquid condition and may easily flow into conformity with the embossed pattern. The term "nip" is understood to mean the place where the space between the rolls is a minimum. The axis of roll 31 should be parallel with roll 51 for producing panels of uniform thickness. The rolls 31 and 51 are positively driven at a predetermined speed and resin is delivered at a controlled rate through pipe 20 so that, considering the speed at which roll 31 is driven, enough resin is laid down to supply the need for resin at the nip and in addition maintain the pool of resin 54 in advance of the nip.

Rolls 55 are provided under the top run of belt 53 to support the belt and prevent sagging, and over the laminate moving along on belt 53 are the heaters 56. These heaters heat the laminate, suitable to a temperature of about 225° to 275° F. for a time, while the laminate is passing on the belt, which may be of the order of 2 to 5 minutes, until the resin is cured. I use the term "cure" and "cured" to mean that the thermosetting resin has "set" to the extent that the resin is substantially solid and its internal bonds are strong so that it will not easily bend and will separate from the belt as the belt turns away.

The laminate as it comes off the belt is illustrated in FIG. 2. The glass fibers are well distributed in the resin layer which at this position is cured and rigid. The embossed polyoxyethyleneoxyterephthaloyl film 22 lies on top of the resin-fiber glass layer 60, and the interface between the film and the glass fiber-resin layer 60 has taken the same pattern as the embossed film. The laminate is passed onwardly and onto a rack 57 having rolls 58 for supporting the laminate as it moves thereon.

The resin cools as it passes onward to storage, but before it is cooled below about 80° F and preferably while it has a temperature of from about 125°–160° F or more, the film may be removed from the glass fiber-resin panel.

This removal may be accomplished by providing the roll 39 which may be driven by suitable means and which rotates the roll of the film from the top of the panel. A guide roll 40 may be provided to guide the film as it comes off the panel. Removal of the film leaves the top surface of the glass fiber reinforced resin panel with the same pattern as was carried by the embossed polyoxyethyleneoxyterephthaloyl film. This gives a very pleasing and decorative appearance to the otherwise plain flat panel.

Further, there is no trouble with "pin holes" formed in the embossed film and there is no leakage of resin through the film when the resin and film come under stress between the pressure rolls.

I am unable to state with certainty why "pin holes" are not formed in the polyoxyethyleneoxyterephthaloyl film as they were in films disclosed in my prior application Ser. No. 673,869. One theory is that the prior films may have had a tendency to form internal structures which were aligned and which when stressed opened to form microscopic slits between them, and that the polyoxyethyleneoxyterephthaloyl film does not have such tendency.

I regard it as an improvement that as set forth in the foregoing description the polyoxyethyleneoxyterephthaloyl film is passed continuously between the embossing rollers to receive the embossed pattern and led directly without interruption along platform 18 where it receives thereon the resin and glass fibers, and thence between pressure rolls 31 and 51, then on belt 53 through the heating zone to cure the resin, and the film removed as the panel moves on. However, it is possible to prepare the polyoxyethyleneoxyterephthaloyl film in advance. Then the prepared roll of polyoxyethyleneoxyterephthaloyl film can be mounted on shaft 11 with the film from this roll being passed directly along platform 18, omitting heaters 13 and rolls 14, 15.

While only one embodiment of my invention has been illustrated and described in detail with mention of some variations, it is understood that the invention is subject to wide variation and many changes may be made, such changes and variations being within the spirit of the invention and the scope of the appended claims.

I claim:

1. A process for making a glass fiber reinforced resin panel comprising embossing a film of polyoxyethyleneoxyterephthaloyl, depositing a liquid thermosetting resin on the embossed film to form a resin layer thereon, depositing glass fibers on said resin to form a laminated structure of glass fibers, resin and embossed polyoxyethyleneoxyterephthaloyl, passing said structure through the nip of a pair of spaced rolls to press said fibers into said resin and to press said resin against said embossed film, and heating said pressed structure to thereby cure said resin.

2. A process as set forth in claim 1 which includes removing said embossed film while said structure is warm whereby to leave the embossed pattern on the surface of the cured resin.

3. In a process for preparing a panel having an embossed surface, the step of pressing a layer of liquid thermosetting resin against an embossed surface of a polyoxyethyleneoxyterephthaloyl film to cause a surface of said layer to conform with the pattern of said embossed film, and heating the lamination so formed to cure the resin layer thereof.

4. A process as set forth in claim 3 including the step of removing said film from said resin layer whereby to leave the embossed pattern on the surface of the cured resin.

5. A process as set forth in claim 3 in which said film is prepared by extruding polyoxyethyleneoxyterephthaloyl to form a film and by biaxially stretching the extruded film.

6. A process as set forth in claim 5 in which said polyoxyethyleneoxyterephthaloyl is a polymer having as a repeating unit the structure.

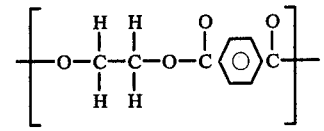

7. A process as set forth in claim 2 in which said film is removed before said film and resin structure has cooled below 80° F.

8. A process as set forth in claim 3 which said thermosetting resin is an unsaturated polyester cross linked with a monomer.

9. A process as set forth in claim 8 in which said monomer is styrene.